Jan. 30, 1945. G. N. PROCTOR 2,368,491
STORAGE BATTERY
Filed July 30, 1940
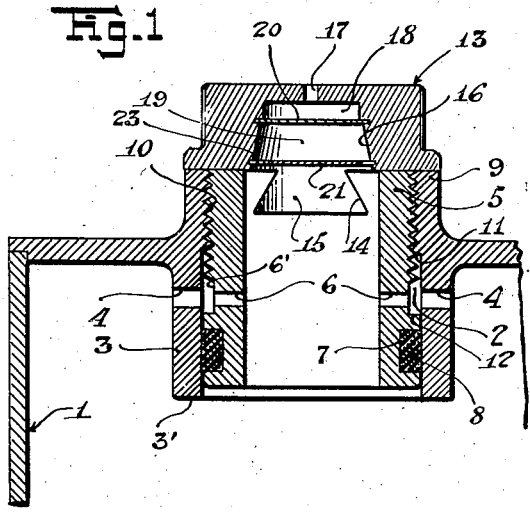
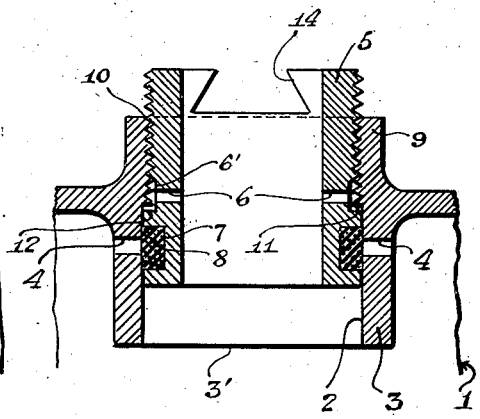
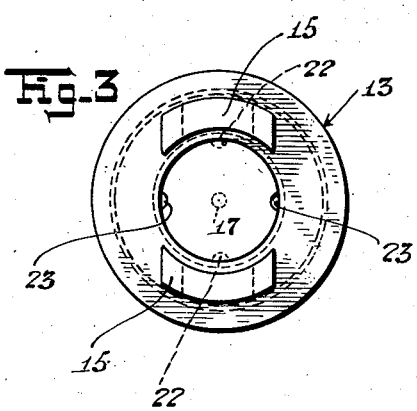
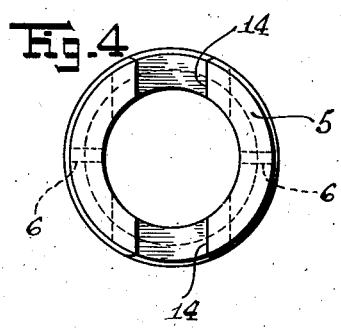
Inventor
George N. Proctor
By Henry Lanahan
Attorney Patented Jan. 30, 1945

2,368,491

UNITED STATES PATENT OFFICE 2,368,491

STORAGE BATTERY

George N. Proctor, Verona, N. J., assignor to Thomas A. Edison, Incorporated, West Orange, N. J., a corporation of New Jersey Application July 30, 1940, Serial No. 348,464

9 Claims. (Cl. 136—178)

This invention relates to storage batteries, especially to those employing a liquid electrolyte and more particularly to improvements in such batteries adapted to facilitate the proper servicing of the batteries and to enhance the protection of the batteries during the periods of their use.

Storage batteries are designed to give best results when the liquid therein does not exceed a predetermined level. Since it is hard to discern the level of the liquid in the battery and since the filling is frequently attended to by laymen under unfavorable lighting conditions, it is important that there be provided simple and readily manipulatable means which will serve to positively prevent overfilling of the battery.

It is an object of my invention to provide an improved openable and closable device for the filler opening of a battery container which is adapted to definitely limit the filling of the battery container to a predetermined level when the device is in open condition and to provide a vent communication between the interior of the battery container and the outside when the device is in closed condition.

Many prior devices for the purpose here mentioned employ a resilient rubber component which, in the operation of the device between open and closed conditions, is subjected to heavy strain. In time this rubber component loses its elasticity, as by a hardening of the rubber through the action of the electrolyte thereon, and the device is rendered inoperative. It is an object of my invention to provide an opening and closing device for a storage battery which is free from the defects just mentioned and which is dependable in its operation through many years of service.

It is another object to construct and arrange the device abovementioned so as to render the same fool proof against misoperation.

It is a further object to provide this device in a form which is simple both in construction and operation.

A feature of my invention is to provide a sleeve valve depending from around the filler opening of the battery, which is closable to form a liquid seal to limit the filling of the battery container, and to provide a vented plug for the filler opening which is connected with the valve to operate the same and which is detachable from the valve to uncover the filler opening only when the valve is in closed position.

Still other objects and features of my invention will more fully appear from the following description and the appended claims.

In the description of my invention reference is had to the accompanying drawing, of which:

Figure 1 is a transverse sectional view, taken through the upper portion of a battery container and illustrating a vent plug and filler opening device in accordance with my invention, the parts thereof being shown in the positions which they occupy when the device is in closed condition;

Figure 2 is another transverse sectional view similar to that of Figure 1 but showing the vent plug removed and the other parts of the device in position for the filling of the battery;

Figure 3 is a bottom view of the vent plug; and

Figure 4 is a partial top view of the structure of Figure 2.

Reference being had to the figures there will be seen a battery container 1 provided with a filler opening 2. Surrounding the filler opening and depending within the battery container is a tube 3 which may have any desired form of cross section but which is preferably made circular as shown. This tube is adapted to serve as a liquid seal to limit the filling of the container to a predetermined level, the limiting in the filling of the battery being effected by the gas which becomes trapped in the battery between the liquid and the top of the battery container when the liquid has been raised to make a sealing contact with the bottom 3' of the tube 3.

In the tube 3 there are provided vents 4 to permit escape of gas while the battery is in use. These vents are closed during filling so that the tube 3 will then serve as a liquid seal as abovementioned. The closing of the vents is effected by means of a sleeve or tubular valve 5 which is made circular in cross section to fit the tube 3. The valve 5 is provided with vents 6 which communicate with the vents 4 through an annular groove 6' on the valve to provide a vent passageway from the interior portion of the battery beyond the tube 3 to the outside when the valve is in its most downward or inward position. In production, the tube 3 and valve 5 cannot practically be maintained within sufficiently close tolerances to insure an airtight seal therebetween. In the present invention an air-tight seal is, however, accomplished by the provision, in an annular groove 7 in the lower end portion of the valve, of a sealing ring 8 which slidably fits the interior surface of the tube. This ring is made of soft rubber and is adapted to take up the play between the valve 5 and the tube 3. The sealing contact provided by this ring 8 between the valve 5 and the tube 3 is maintained, particularly in view of the moisture which is usually present between the ring and the tube, through a long period of use of the device. This is because the ring is merely slid along the tube, into and out of position to close the vents 4, but without involving any change in the degree of compression of the ring, as the valve is moved upwardly and downwardly along the tube. Thus should the ring harden through aging, a sufficiently close fitting of the ring to the tube will be preserved to maintain a sealing contact between the valve and the tube.

Extending upwardly from the container 1 is an annular flange 9 which forms an extension of the filler opening 2. The valve 5 is threaded through this flange, as at 10, and is thus upon rotation movable axially downwardly and inwardly of the filler opening into positions wherein it closes and opens the vents 4. In order that the valve may not be entirely removed from the container and become inadvertently lost during a battery filling operation, the flange 9 is reduced slightly in diameter as compared to the tube 3 to provide an annular shoulder 11 at its lower portion and the valve 5 is provided with an annular shoulder 12 which impinges against the shoulder 11 to limit the outward movement of the valve should an effort be made to unthread the valve outwardly beyond its normal travel.

The turning of the valve 5 and the closing of the filler opening 2 are effected by means of a vent cap in plug 13. This plug is connected to the valve in a way to permit detachment of the plug from the valve only when the valve is in the outward position wherein it closes the vents 4. This detachable connection is in the form of a dovetail joint which comprises two diametrically disposed radially extending slots 14 in the upper part of the tubular valve 5 and two similarly disposed tenons 15 on the plug which slidably fit the slots 14, the slots and tenons having tapered sides to form an interlocking joint. This joint resists pulling apart in all directions except one—the direction radial to the valve along the slots; however, until the valve 5 is threaded upwardly sufficiently to bring the tenons 15 above the level of the top the flange 9 of the joint is even prevented by the abutment of the tenons against the inner wall of the flange, from being pulled apart in this one direction. Thus when the valve is threaded downwardly in position to cause the plug to bear against the top of the flange 9, the position wherein the valve renders the vents 4 open, the plug is locked and cannot be detached, but as the valve is threaded upwardly to bring the tenons 15 above the top of the flange 9 the plug is rendered detachable to uncover the filler opening. In order that this detachability of the plug will not be permitted to occur before the valve has been threaded sufficiently upwardly to close the vents 4, the length of the tenons are chosen to be just slightly less than the distance of vertical travel of the valve between its vent-opening and vent-closing positions.

The plug 13 is vented to permit escape of gas from the interior of the battery 2. The venting for the plug includes a circular recess 16 which extends upwardly from the bottom of the plug nearly to its top, and a vent 17 which extends through the top of the plug from the recess. The recess 16 is subdivided into compartments 18 and 19 by means of upper and lower partitions 20 and 21 which extend transversely across the recess. The partitions are each vented but their vents are offset from one another so as to provide a non-linear passageway from the vent 17 through the partitions; this is done in order that the partitions will serve as baffles to prevent the passage of dirt through the plug into the battery and the escape of electrolyte from the battery through the vent 17 during ordinary usage. Such non-linear vent passageway through the plug is conveniently effected by placing the vent 17 at the center of the recess and then providing a pair of diametrically disposed vents 22 in the upper partition 20 near the outer edge thereof and another pair of such vents 23 in the lower portion 21 which are disposed on a diameter line at right angles to that through the vents 22.

It will be understood that the particular embodiment herein disclosed is subject to many changes and modifications without departure from the scope of my invention, which I endeavor to express according to the following claims.

I claim:

1. In a device for a vented filler opening of a storage battery, including a wall depending within the battery around said opening to a predetermined liquid level and having a vent extending therethrough: the combination of a valve in said filler opening for said vent having an opening therein permitting a passage of liquid through the filler opening into the battery; a cap for said filler opening; and an element on said cap in interlocking engagement with said valve in directions of said filler opening for holding the cap to the valve and for rendering the valve operable by the cap, said element being detachable from said valve only by a movement of the cap relatively to the valve in a direction transverse to the filler opening.

2. The structure as set forth in claim 1, wherein said connecting means is maintained in connected relationship when said valve is in vent-opening position and is rendered separable upon moving said valve to vent-closing position.

3. In a device for a vented filler opening of a storage battery, including a wall depending within the battery around said opening to a predetermined liquid level and having a vent extending therethrough: the combination of a valve movably fitting the interior of said wall and having an opening extending therethrough to permit passage of liquid through the filler opening into the battery, said valve being movable outwardly and inwardly of said filler opening to close and open said vent; a cap for said filler opening; and an element on said cap in interlocking engagement with said valve in directions of said filler opening for holding the cap to the valve and for positively manipulating the valve by the cap, said element being detachably joined to said valve only by a movement of the cap relatively to said valve in a direction transverse to said filler opening, said wall serving to retain said element in connected relationship with said valve when the valve is in vent-opening position.

4. In a device for limiting the filling of a storage battery container having a cover provided with a threaded filler opening: the combination of a threaded tubular member engaging the threaded opening of said cover for bodily vertical movement upon rotation in said opening; means associated with said member and depending below said cover for providing a gas-trapping space surrounding said filler opening between the cover and a normally filled level when said member is in raised position and for providing a vent passageway from said space into said filler opening when said member is in lowered position; and a cap for said filler opening having means for detachably engaging the cap with said tubular member by radial movement in relation thereto only in said raised position of the valve and for interlocking them for axial movement together for positively manipulating said tubular member by said cap in a vertical direction between said raised and lowered positions.

5. In a device for limiting the filling of a storage battery container having a cover provided with a threaded filler opening: the combination of a threaded tubular valve engaging the threaded opening of said cover for bodily vertical movement upon rotation in said opening; means associated with said valve and having a portion depending below said cover for providing a gas-trapping space surrounding said depending portion between the cover and a normally filled level when said valve is in raised position and for providing a vent passageway from said space into said filler opening when said valve is in lowered position; a cap for said filler opening; and means detachably connecting said cap to said valve comprising a portion depending from said cap and an upper portion of said valve extending above the filler opening of said cover when the valve is in said raised position, said portions being detachably interlockingly connectable only by radial movement of the cap relative to said tubular valve when the valve is in said raised position, and said portions being adapted when in connected relation to positively secure the cap to the valve for axial and rotational movement therewith.

6. A device for a vented filler opening of a storage battery, adapted for limiting the level of filling of the battery, comprising a wall surrounding said filler opening and depending within the battery to a predetermined liquid level, said wall having a vent extending therethrough; a vent valve in said filler opening having an opening therein permitting passage of liquid through the filler opening into the battery, said valve being movable outwardly and inwardly of the filler opening into vent-opening and vent-closing positions; a cap for said filler opening; and means for connecting said cap to said valve and adapted to locate the valve in vent-opening position when the cap is in closed position, said connecting means comprising a tenon on said cap extending into said filler opening, said tenon being in interlocking engagement with the upper end portion of said valve in directions of said filler opening for holding the cap to the valve and being detachable from the valve only by movement of the cap in a direction radial of said filler opening, and the length of said tenon being substantially equal to the distance of vertical movement of the valve between its vent-opening and vent-closing positions.

7. In a device for the filler opening of a storage battery, comprising a tube of circular cross section depending within the battery from around said filler opening to a predetermined liquid level and having a vent extending therethrough; the combination of a tubular valve threaded into said filler opening and turnable inwardly to open said vent and outwardly to close the vent; a vented plug having a closed position wherein it covers said filler opening; and means detachably connecting said plug to said valve to locate the valve in vent-opening position when the plug is in closed position, said connecting means comprising a part on said plug and another part on said valve interlocked in dovetail relationship and detachable only by a movement of the plug relative to the valve in a direction sidewise of said filler opening, the part on said plug being extended into said tube and being adapted to impinge against the sidewall of the tube to prevent detachment of the plug while the plug is in vent detachment of the plug while the plug is in closed position, and the length of the said part of the plug being substantially equal to the distance of travel of the valve from vent-opening to vent-closing position whereby to enforce moving the valve to vent-closing position to permit a detachment of the plug.

8. In a device associated with the filler opening of a battery container for limiting the level of the liquid electrolyte: the combination of a wall surrounding said filler opening and depending from the cover of the battery container within the battery to a predetermined liquid level, said wall having a vent extending therethrough; a vertically-movable valve in said filler opening for said vent having an opening extending therethrough, said valve closing said vent when the valve is in raised position and opening said vent when the valve is in lowered position; a vented closure element for said filler opening; and a dovetail joint between said closure element and valve for manipulating said valve by said closure element, said joint comprising a tenon on the closure element for detachable engagement with the upper portion of said valve by radial movement in relation thereto only when the valve is in raised position, said tenon being blocked by the side wall of said filler opening when the valve is in lowered position to prevent detachment of said closure element from said valve.

9. In a device for limiting the filling of a storage battery container having a cover provided with a filler opening: the combination of an annular wall depending from said cover from around said filler opening to a predetermined liquid level and having a vent extending therethrough; a valve threaded into said filler opening for bodily vertical movement upon rotation in said opening and having an axial hole extending therethrough, said valve further having an annular portion in substantially tight engagement with the interior surface of said wall and another portion spaced axially in relation to the valve from said first portion and provided with an annular peripheral groove and with a vent leading from said groove to said axial hole of the valve, a rotation of said valve in said filler opening in one direction serving to move the valve vertically to place the first-mentioned portion thereof in closing relation with said wall vent, and a rotation of the valve in the other direction serving to place said groove of the valve in registration with said wall vent, said groove being adapted to afford communication between the vents of said wall and valve, irrespective of the threaded angular position of the valve in said filler opening, so long as the groove is in registration with said wall vent.

GEORGE N. PROCTOR.